United States Patent
Spiegel et al.

(10) Patent No.: US 11,463,394 B2
(45) Date of Patent: *Oct. 4, 2022

(54) APPARATUS AND METHOD FOR ALTERNATE CHANNEL COMMUNICATION INITIATED THROUGH A COMMON MESSAGE THREAD

(71) Applicant: Snap Inc., Santa Monica, CA (US)

(72) Inventors: Evan Spiegel, Los Angeles, CA (US); Robert Cornelius Murphy, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,803

(22) Filed: Mar. 5, 2021

(65) Prior Publication Data

US 2021/0336914 A1    Oct. 28, 2021

Related U.S. Application Data

(63) Continuation of application No. 16/053,519, filed on Aug. 2, 2018, now Pat. No. 10,958,605, which is a (Continued)

(51) Int. Cl.
*H04L 51/216* (2022.01)
*H04L 51/10* (2022.01)
(Continued)

(52) U.S. Cl.
CPC ............ *H04L 51/216* (2022.05); *G06F 3/017* (2013.01); *G06F 3/0481* (2013.01); (Continued)

(58) Field of Classification Search
CPC ..... H04L 12/1822; H04L 67/22; H04L 51/04; G06F 2201/875
See application file for complete search history.

(56) References Cited

U.S. PATENT DOCUMENTS 5,999,932 A   12/1999  Paul
6,154,764 A   11/2000  Nitta et al.
(Continued)

FOREIGN PATENT DOCUMENTS

CA    2887596 A1    7/2015
EP    2418606 A2    2/2012
(Continued)

OTHER PUBLICATIONS

"Android Getting Started Guide", Voxer Business, [Online] Retrieved from the Internet: <URL: https://voxer.com/assets/AndroidGuide.pdf>, (Feb. 1, 2014), 18 pgs.
(Continued)

*Primary Examiner* — Justin S Lee
(74) *Attorney, Agent, or Firm* — Schwegman Lundberg & Woessner, P.A.

(57) ABSTRACT

A server includes a processor and a memory storing a multiple channel message thread module with instructions executed by the processor to identify when participants at client devices are viewing a common message thread. An alternate channel communication prompt is supplied to the client devices. An alternate channel communication is delivered to the client devices in response to activation of the alternate channel communication prompt by at least one participant.

20 Claims, 4 Drawing Sheets

Related U.S. Application Data continuation of application No. 14/616,618, filed on Feb. 6, 2015, now Pat. No. 10,084,735, which is a continuation of application No. 14/187,005, filed on Feb. 21, 2014, now abandoned.

(51) Int. Cl.

| | | |
|---|---|---|
| *G06F 3/04895* | (2022.01) | |
| *H04L 51/046* | (2022.01) | |
| *G06F 3/01* | (2006.01) | |
| *G06F 3/0481* | (2022.01) | |

(52) U.S. Cl.
CPC ........ *G06F 3/04895* (2013.01); *H04L 51/046* (2013.01); *H04L 51/10* (2013.01)

(56) References Cited

U.S. PATENT DOCUMENTS

| | | | |
|---|---|---|---|
| 6,167,435 | A | 12/2000 | Druckenmiller et al. |
| 6,204,840 | B1 | 3/2001 | Petelycky et al. |
| 6,216,141 | B1 | 4/2001 | Straub et al. |
| 6,310,694 | B1 | 10/2001 | Okimoto et al. |
| 6,442,590 | B1 | 8/2002 | Inala et al. |
| 6,484,196 | B1 | 11/2002 | Maurille |
| 6,606,657 | B1 | 8/2003 | Zilberstein et al. |
| 6,665,531 | B1 | 12/2003 | Soderbacka et al. |
| 6,724,403 | B1 | 4/2004 | Santoro et al. |
| 6,757,713 | B1 | 6/2004 | Ogilvie et al. |
| 6,879,994 | B1 | 4/2005 | Matsliach et al. |
| 6,898,626 | B2 | 5/2005 | Ohashi |
| 7,004,394 | B2 | 2/2006 | Kim |
| 7,124,164 | B1 | 10/2006 | Chemtob |
| 7,149,893 | B1 | 12/2006 | Leonard et al. |
| 7,203,380 | B2 | 4/2007 | Chiu et al. |
| 7,243,163 | B1 | 7/2007 | Friend et al. |
| 7,356,564 | B2 | 4/2008 | Hartselle et al. |
| 7,519,670 | B2 | 4/2009 | Hagale et al. |
| 7,856,449 | B1 | 12/2010 | Martino et al. |
| 8,001,204 | B2 | 8/2011 | Burtner et al. |
| 8,098,904 | B2 | 1/2012 | Ioffe et al. |
| 8,112,716 | B2 | 2/2012 | Kobayashi |
| 8,276,092 | B1 | 9/2012 | Narayanan et al. |
| 8,279,319 | B2 | 10/2012 | Date |
| 8,312,086 | B2 | 11/2012 | Velusamy et al. |
| 8,312,097 | B1 | 11/2012 | Siegel et al. |
| 8,379,130 | B2 | 2/2013 | Forutanpour et al. |
| 8,405,773 | B2 | 3/2013 | Hayashi et al. |
| 8,418,067 | B2 | 4/2013 | Cheng et al. |
| 8,428,453 | B1 | 4/2013 | Spiegel et al. |
| 8,471,914 | B2 | 6/2013 | Sakiyama et al. |
| 8,560,612 | B2 | 10/2013 | Kilmer et al. |
| 8,687,021 | B2 | 4/2014 | Bathiche et al. |
| 8,744,523 | B2 | 6/2014 | Fan et al. |
| 8,775,407 | B1 | 7/2014 | Huang |
| 8,775,972 | B2 | 7/2014 | Spiegel |
| 8,788,680 | B1 | 7/2014 | Naik |
| 8,797,415 | B2 | 8/2014 | Arnold |
| 8,856,349 | B2 | 10/2014 | Jain et al. |
| 8,914,752 | B1 | 12/2014 | Spiegel |
| 9,026,943 | B1 | 5/2015 | Spiegel |
| 9,037,577 | B1 | 5/2015 | Saylor et al. |
| 9,083,770 | B1 | 7/2015 | Drose et al. |
| 9,098,832 | B1 | 8/2015 | Scardino |
| 9,225,897 | B1 | 12/2015 | Sehn et al. |
| 9,237,202 | B1 | 1/2016 | Sehn |
| 9,276,886 | B1 | 3/2016 | Samaranayake |
| 9,396,354 | B1 | 7/2016 | Murphy et al. |
| 9,407,712 | B1 | 8/2016 | Sehn |
| 9,407,816 | B1 | 8/2016 | Sehn |
| 9,660,950 | B2 | 5/2017 | Archibong et al. |
| 9,785,796 | B1 | 10/2017 | Murphy et al. |
| 10,082,926 | B1 | 9/2018 | Spiegel et al. |
| 10,084,735 | B1 | 9/2018 | Spiegel et al. |
| 10,949,049 | B1 | 3/2021 | Spiegel et al. |
| 10,958,605 | B1 | 3/2021 | Spiegel |
| 2002/0047868 | A1 | 4/2002 | Miyazawa |
| 2002/0122659 | A1 | 9/2002 | Mcgrath et al. |
| 2002/0144154 | A1 | 10/2002 | Tomkow |
| 2003/0016247 | A1 | 1/2003 | Lai et al. |
| 2003/0052925 | A1 | 3/2003 | Daimon et al. |
| 2003/0126215 | A1 | 7/2003 | Udell |
| 2003/0164856 | A1 | 9/2003 | Prager et al. |
| 2004/0027371 | A1 | 2/2004 | Jaeger |
| 2004/0111467 | A1 | 6/2004 | Willis |
| 2004/0203959 | A1 | 10/2004 | Coombes |
| 2004/0243531 | A1 | 12/2004 | Dean |
| 2005/0078804 | A1 | 4/2005 | Yomoda |
| 2005/0097176 | A1 | 5/2005 | Schatz et al. |
| 2005/0104976 | A1 | 5/2005 | Currans |
| 2005/0114783 | A1 | 5/2005 | Szeto |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2006/0114338 | A1 | 6/2006 | Rothschild |
| 2006/0270419 | A1 | 11/2006 | Crowley et al. |
| 2007/0040931 | A1 | 2/2007 | Nishizawa |
| 2007/0064899 | A1 | 3/2007 | Boss et al. |
| 2007/0073823 | A1 | 3/2007 | Cohen et al. |
| 2007/0082707 | A1 | 4/2007 | Flynt et al. |
| 2007/0192128 | A1 | 8/2007 | Celestini |
| 2007/0214216 | A1 | 9/2007 | Carrer et al. |
| 2007/0229651 | A1 | 10/2007 | Nakajima |
| 2007/0233801 | A1 | 10/2007 | Eren et al. |
| 2007/0243887 | A1 | 10/2007 | Bandhole et al. |
| 2007/0255456 | A1 | 11/2007 | Funayama |
| 2008/0010266 | A1 | 1/2008 | Brunn et al. |
| 2008/0025701 | A1 | 1/2008 | Ikeda |
| 2008/0033930 | A1 | 2/2008 | Warren |
| 2008/0055269 | A1 | 3/2008 | Lemay et al. |
| 2008/0104169 | A1 | 5/2008 | Combel et al. |
| 2008/0104503 | A1 | 5/2008 | Beall et al. |
| 2008/0132275 | A1 | 6/2008 | Eastwood |
| 2008/0207176 | A1 | 8/2008 | Brackbill et al. |
| 2008/0222545 | A1 | 9/2008 | Lemay |
| 2008/0256446 | A1 | 10/2008 | Yamamoto |
| 2008/0266421 | A1 | 10/2008 | Takahata et al. |
| 2008/0270938 | A1 | 10/2008 | Carlson |
| 2008/0313346 | A1 | 12/2008 | Kujawa et al. |
| 2009/0006565 | A1 | 1/2009 | Velusamy et al. |
| 2009/0015703 | A1 | 1/2009 | Kim et al. |
| 2009/0024956 | A1 | 1/2009 | Kobayashi |
| 2009/0040324 | A1 | 2/2009 | Nonaka |
| 2009/0042588 | A1 | 2/2009 | Lottin et al. |
| 2009/0058822 | A1 | 3/2009 | Chaudhri |
| 2009/0079846 | A1 | 3/2009 | Chou |
| 2009/0132453 | A1 | 5/2009 | Hangartner et al. |
| 2009/0132665 | A1 | 5/2009 | Thomsen et al. |
| 2009/0160970 | A1 | 6/2009 | Fredlund et al. |
| 2009/0265647 | A1 | 10/2009 | Martin et al. |
| 2010/0082693 | A1 | 4/2010 | Hugg et al. |
| 2010/0131880 | A1 | 5/2010 | Lee et al. |
| 2010/0131895 | A1 | 5/2010 | Wohlert |
| 2010/0156933 | A1 | 6/2010 | Jones et al. |
| 2010/0159944 | A1 | 6/2010 | Pascal et al. |
| 2010/0161831 | A1 | 6/2010 | Haas et al. |
| 2010/0185665 | A1 | 7/2010 | Horn et al. |
| 2010/0214436 | A1 | 8/2010 | Kim et al. |
| 2010/0223128 | A1 | 9/2010 | Dukellis et al. |
| 2010/0223343 | A1 | 9/2010 | Bosan et al. |
| 2010/0257196 | A1 | 10/2010 | Waters et al. |
| 2010/0281045 | A1 | 11/2010 | Dean |
| 2010/0306669 | A1 | 12/2010 | Della Pasqua |
| 2011/0004071 | A1 | 1/2011 | Faiola et al. |
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0102605 | A1 | 5/2011 | Hannaford |
| 2011/0102630 | A1 | 5/2011 | Rukes |
| 2011/0141025 | A1 | 6/2011 | Tsai |
| 2011/0145564 | A1 | 6/2011 | Moshir et al. |

(56) References Cited

U.S. PATENT DOCUMENTS

| | | |
|---|---|---|
| 2011/0184980 A1 | 7/2011 | Jeong et al. |
| 2011/0197194 A1 | 8/2011 | D'Angelo et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0214066 A1 | 9/2011 | Chitturi et al. |
| 2011/0273575 A1 | 11/2011 | Lee |
| 2011/0283188 A1 | 11/2011 | Farrenkopf |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0163664 A1 | 6/2012 | Zhu |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0308044 A1 | 12/2012 | Vander Mey et al. |
| 2012/0309542 A1 | 12/2012 | Nogami et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0156175 A1 | 6/2013 | Bekiares et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0085334 A1 | 3/2014 | Payne |
| 2014/0089314 A1 | 3/2014 | Iizuka et al. |
| 2014/0100997 A1 | 4/2014 | Mayerle et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0029821 A1 | 10/2014 | Park et al. |
| 2014/0317302 A1 | 10/2014 | Naik |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0046278 A1 | 2/2015 | Pei et al. |
| 2015/0094106 A1 | 4/2015 | Grossman et al. |
| 2015/0116529 A1 | 4/2015 | Wu et al. |
| 2015/0172534 A1 | 6/2015 | Miyakawa et al. |
| 2015/0222814 A1 | 8/2015 | Li et al. |
| 2015/0350450 A1 | 12/2015 | Rose et al. |
| 2016/0006927 A1 | 1/2016 | Sehn |
| 2021/0306291 A1 | 9/2021 | Spiegel et al. |

FOREIGN PATENT DOCUMENTS

| | | |
|---|---|---|
| EP | 2482537 A1 | 8/2012 |
| KR | 20120003323 A | 1/2012 |
| WO | WO-2013008238 A1 | 1/2013 |
| WO | WO-2014194262 A2 | 12/2014 |
| WO | WO-2016007285 A1 | 1/2016 |

OTHER PUBLICATIONS

"U.S. Appl. No. 14/187,005, Advisory Action dated Dec. 5, 2014", 3 pgs.

"U.S. Appl. No. 14/187,005, Decision on Pre-Appeal Brief Request mailed Jan. 23, 2015", 2 pgs.

"U.S. Appl. No. 14/187,005, Examiner Interview Summary dated Feb. 12, 2015", 3 pgs.

"U.S. Appl. No. 14/187,005, Final Office Action dated Nov. 6, 2014", 13 pgs.

"U.S. Appl. No. 14/187,005, Non Final Office Action dated Jul. 2, 2014", 10 pgs.

"U.S. Appl. No. 14/187,005, Pre-Appeal Brief Conference Request filed Dec. 16, 2014", 5 pgs.

"U.S. Appl. No. 14/187,005, Response filed Aug. 6, 2014 to Non Final Office Action dated Jul. 2, 2014", 5 pgs.

"U.S. Appl. No. 14/187,005, Response filed Nov. 25, 2014 to Final Office Action dated Nov. 6, 2014", 6 pgs.

"U.S. Appl. No. 14/510,051, Advisory Action dated Jun. 7, 2017", 3 pgs.

"U.S. Appl. No. 14/510,051, Examiner Interview Summary dated Jul. 21, 2017", 5 pgs.

"U.S. Appl. No. 14/510,051, Final Office Action dated Apr. 4, 2017", 22 pgs.

"U.S. Appl. No. 14/510,051, Final Office Action dated Dec. 13, 2017", 16 pgs.

"U.S. Appl. No. 14/510,051, Non Final Office Action dated Jul. 12, 2017", 20 pgs.

"U.S. Appl. No. 14/510,051, Non Final Office Action dated Nov. 4, 2016", 10 pgs.

"U.S. Appl. No. 14/510,051, Notice of Allowability dated May 10, 2018", 2 pgs.

"U.S. Appl. No. 14/510,051, Notice of Allowance dated May 2, 2018", 9 pgs.

(56) References Cited

OTHER PUBLICATIONS

"U.S. Appl. No. 14/510,051, Response filed Mar. 13, 2018 to Final Office Action dated Dec. 13, 2017", 6 pgs.
"U.S. Appl. No. 14/616,618, Advisory Action Jun. 9, 2017", 4 pgs.
"U.S. Appl. No. 14/616,618, Examiner Interview Summary dated Feb. 6, 2015", 3 pgs.
"U.S. Appl. No. 14/616,618, Final Office Action dated Apr. 7, 2017", 29 pgs.
"U.S. Appl. No. 14/616,618, Final Office Action dated Dec. 13, 2017", 14 pgs.
"U.S. Appl. No. 14/616,618, Non Final Office Action dated Jul. 17, 2017", 28 pgs.
"U.S. Appl. No. 14/616,618, Non Final Office Action dated Nov. 4, 2016", 13 pgs.
"U.S. Appl. No. 14/616,618, Notice of Allowance dated May 1, 2018", 9 pgs.
"U.S. Appl. No. 14/616,618, Response file Mar. 13, 2018 to Final Office Action dated Dec. 13, 2017", 6 pgs.
"U.S. Appl. No. 14/616,618, Response filed May 25, 17 to Final Office Action dated Apr. 7, 2017", 3 pgs.
"U.S. Appl. No. 14/616,618, Response filed Jul. 7, 2017 to Advisory Action dated Jun. 9, 2017", 5 pgs.
"U.S. Appl. No. 14/616,618, Response filed Sep. 14, 2017 to Non Final Office Action dated Jul. 17, 2017", 4 pgs.
"U.S. Appl. No. 14/616,618, Response filed Dec. 20, 2016 to Non Final Office Action dated Nov. 4, 2016", 5 pgs.
"U.S. Appl. No. 16/053,519, Examiner Interview Summary dated Apr. 23, 2020", 3 pgs.
"U.S. Appl. No. 16/053,519, Final Office Action dated Feb. 18, 2020", 14 pgs.
"U.S. Appl. No. 16/053,519, Final Office Action dated Sep. 4, 2020", 16 pgs.
"U.S. Appl. No. 16/053,519, Non Final Office Action dated May 11, 2020", 18 pgs.
"U.S. Appl. No. 16/053,519, Non Final Office Action dated Sep. 27, 2019", 13 pgs.
"U.S. Appl. No. 16/053,519, Notice of Allowance dated Nov. 12, 2020", 10 pgs.
"U.S. Appl. No. 16/053,519, Response filed Jan. 27, 2020 to Non Final Office Action dated Sep. 27, 2019", 8 pgs.
"U.S. Appl. No. 16/053,519, Response filed Apr. 22, 2020 to Final Office Action dated Feb. 18, 2020", 10 pgs.
"U.S. Appl. No. 16/053,519, Response filed Aug. 11, 2020 to Non Final Office Action dated May 11, 2020", 9 pgs.
"U.S. Appl. No. 16/053,519, Response filed Oct. 23, 2020 to Final Office Action dated Sep. 4, 2020", 8 pgs.
"U.S. Appl. No. 16/059,834, Examiner Interview Summary dated Apr. 23, 2020", 3 pgs.
"U.S. Appl. No. 16/059,834, Final Office Action dated Feb. 19, 2020", 15 pgs.
"U.S. Appl. No. 16/059,834, Non Final Office Action dated May 11, 2020", 18 pgs.
"U.S. Appl. No. 16/059,834, Non Final Office Action dated Sep. 30, 2019", 11 pgs.
"U.S. Appl. No. 16/059,834, Response filed Jan. 30, 2020 to Non-Final Office Action dated Sep. 30, 2019", 8 pgs.
"U.S. Appl. No. 16/059,834, Response filed Apr. 22, 2020 to Final Office Action dated Feb. 19, 2020", 9 pgs.
"U.S. Appl. No. 16/059,834, Response filed Aug. 11, 2020 to Non Final Office Action dated May 11, 2020", 9 pgs.
"European Application Serial No. 14804343.3, European Search Opinion dated Sep. 29, 2016", 7 pgs.
"European Application Serial No. 14804343.3, Supplementary European Search Report dated Sep. 29, 2016", 2 pgs.
"European Application Serial No. 15819676.6, European Search Opinion dated Oct. 12, 2017", 4 pgs.
"European Application Serial No. 15819676.6, Supplementary European Search Report dated Oct. 12, 2017", 2 pgs.
"How Snaps are Stored and Deleted", Snapchat, [Online] Retrieved from the Internet: <URL: https://www.snap.com/en-US/news/post/how-snaps-are-stored-and-deleted/>, (May 9, 2013), 2 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"iVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
Fajman, "An Extensible Message Format for Message Disposition Notifications", Request for Comments: 2298, National Institutes of Health, (Mar. 1998), 28 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
"U.S. Appl. No. 17/193,667, Response filed Feb. 18, 2022 to Non Final Office Action dated Nov. 18, 2021", 11 pgs.
"U.S. Appl. No. 16/059,834, Final Office Action dated Sep. 4, 2020", 16 pgs.
"U.S. Appl. No. 16/059,834, Notice of Allowance dated Nov. 12, 2020", 10 pgs.
"U.S. Appl. No. 16/059,834, Response filed Oct. 23, 2020 to Final Office Action dated Sep. 4, 2020", 7 pgs.
"U.S. Appl. No. 17/193,667, Non Final Office Action dated Nov. 18, 2021", 9 pgs.

APPARATUS AND METHOD FOR ALTERNATE CHANNEL COMMUNICATION INITIATED THROUGH A COMMON MESSAGE THREAD

CROSS REFERENCE TO RELATED APPLICATIONS

This application is a continuation of U.S. patent application Ser. No. 14/187,005 filed Feb. 21, 2014, the contents of which are incorporated herein by reference.

FIELD OF THE INVENTION

This invention relates generally to communications in computer networks. More particularly, this invention relates to techniques for initiating an additional communication channel from a common text message communication channel.

BACKGROUND OF THE INVENTION

Currently, when a first individual desires to initiate a telephone call or video call with a second individual the first individual uses his or her communication equipment to initiate a ringtone at the communication equipment of the second individual. Acknowledgement of the ringtone is required to establish the presence of the second individual. The ring tone notification technique has been relied upon since the inception of telephones, well over one hundred years ago. It would be desirable to find an alternate methodology to establish the presence of an individual and to initiate conversations, without reliance upon a technique over one hundred years old that is a relic of the technical constraints of analog telephony.

SUMMARY OF THE INVENTION

A server includes a processor and a memory storing a multiple channel message thread module with instructions executed by the processor to identify when participants at client devices are viewing a common message thread. An alternate channel communication prompt is supplied to the client devices. An alternate channel communication is delivered to the client devices in response to activation of the alternate channel communication prompt by at least one participant.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
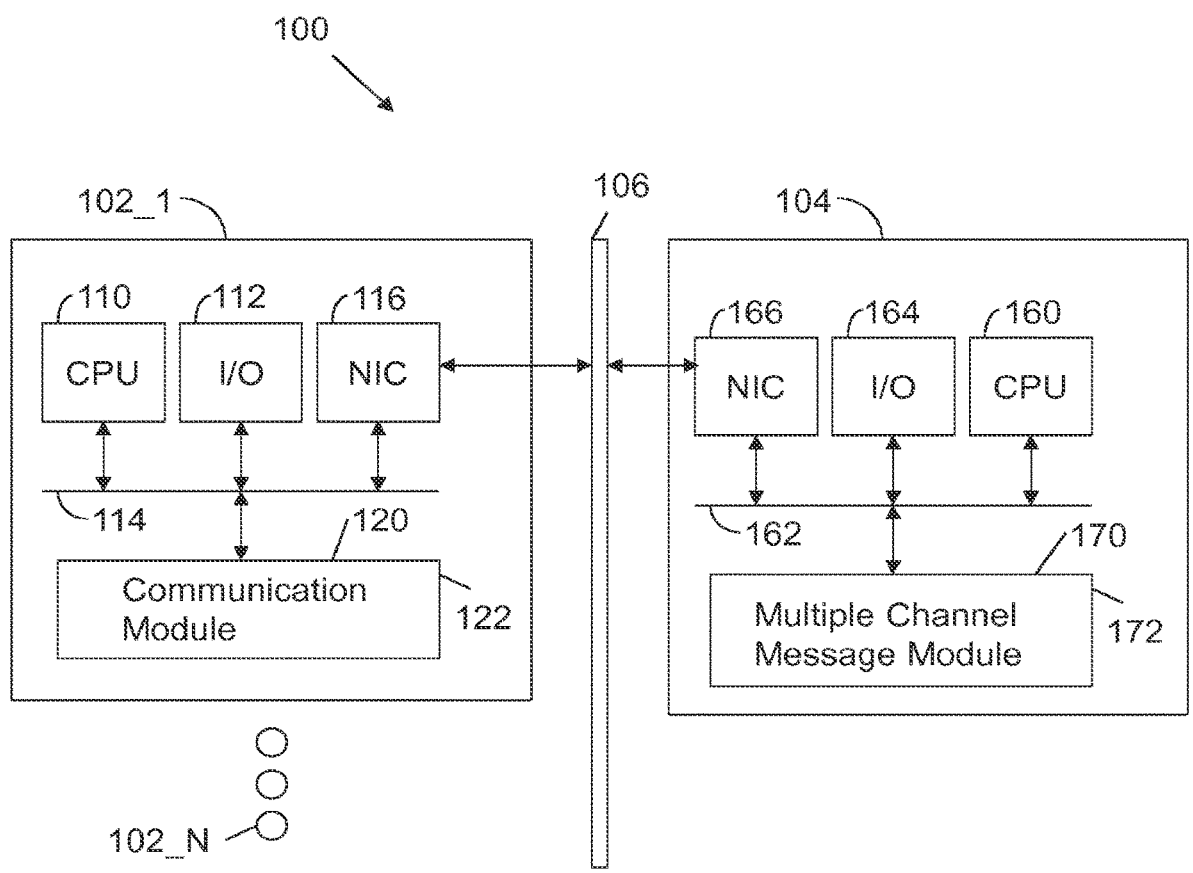
FIG. 1 illustrates a system configured in accordance with an embodiment of the invention.

FIG. 1 illustrates a system 100 configured in accordance with an embodiment of the invention. The system 100 includes a set of client devices 102_1 through 102_N connected to a server 104 via a network 106, which may be any combination of wired and wireless networks.

Each client device 102 includes standard components, such as a central processing unit 110 and input/output devices 112 connected via a bus 114. The input/output devices 112 may include a touch display, keyboard, trackball and the like. A network interface circuit 116 is also connected to the bus 114 to provide connectivity to network 106. A memory 120 is also connected to the bus 114. The memory 120 stores a communication module 122, which may be a browser or an application to support communications with server 104. The client device 102 is typically a mobile device, such as a Smartphone or Tablet.

Server 104 also includes standard components, such as a central processing unit 160, a bus 162, input/output devices 164 and a network interface circuit 166. A memory 170 is also connected to the bus 162. The memory 170 stores a multiple channel message module 172, which includes executable instructions to implement operations of the invention. In short, the executable instructions identify the common presence of participants in a text based thread. In response, to such common presence, participants are afforded the opportunity to initiate an alternate communication channel, such as an audio channel or voice channel without the prerequisite of a ringtone.

Figure 2:
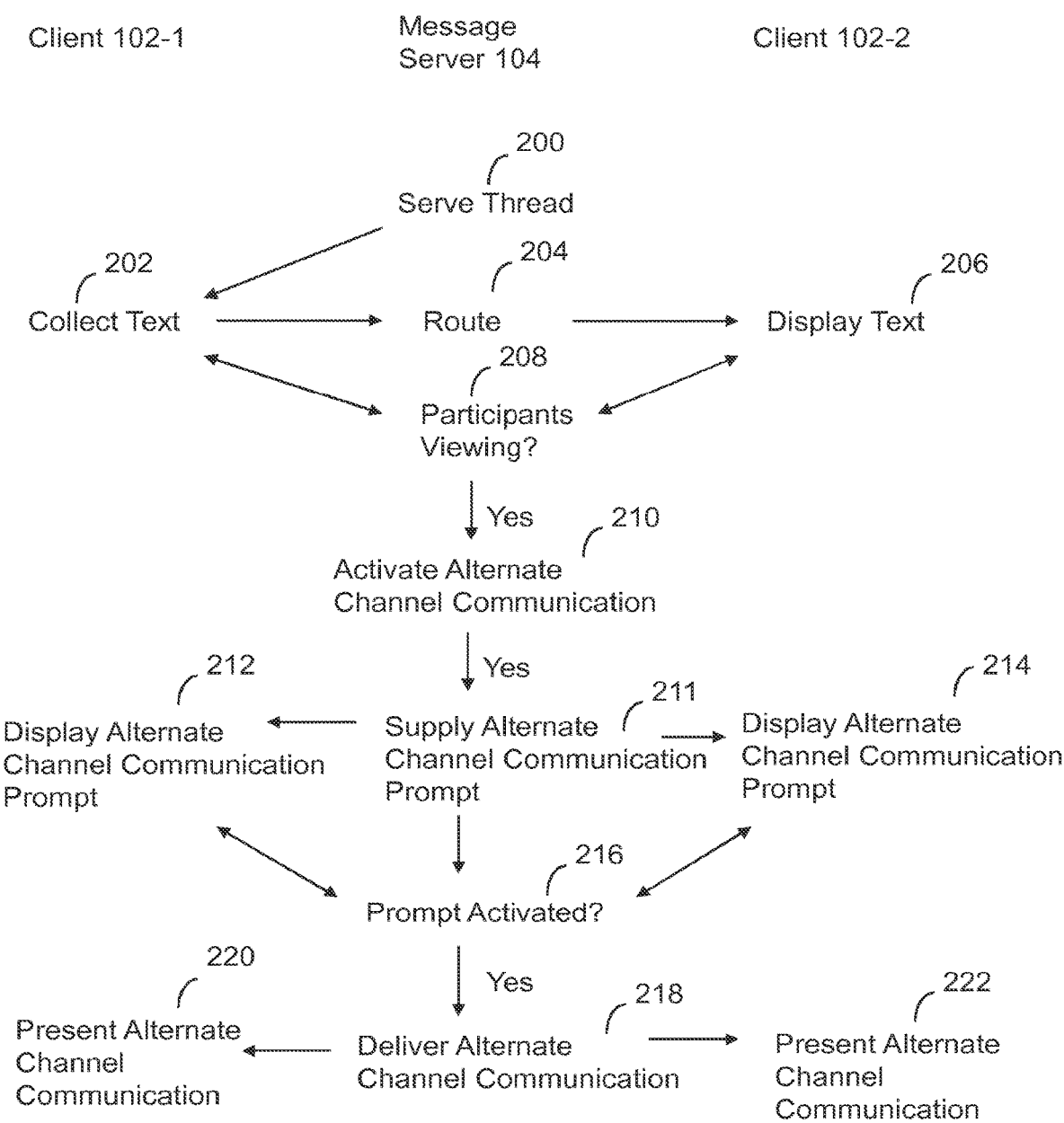
FIG. 2 illustrates processing operations associated with an embodiment of the invention.

FIG. 2 illustrates operations associated with an embodiment of the invention. In particular, the figure illustrates operations performed by two client devices 102_1 and 102_2, as coordinated by the message server 104. Initially, the message server 104 serves a thread 200. By way of example, the thread is a text communication sequence between a first participant associated with client 102_1 and a second participant associated with client 102_2. Additional participants may be involved, but are omitted for simplicity of presentation.

The client device 102_1 collects a new text entry 202, which is routed by the message server 104 to client 102_2. The client 102_2 displays the text 206. The message server 104 determines if the participants are viewing the same thread 208. That is, the message server 104 evaluates whether each client device is actively displaying the same thread on the display of the client device. If so, the message server proactively activates an alternate channel communication 210. This can be thought of as a digital call set-up, where the telephone call is muted but active. The server also supplies each device with an alternate channel communication prompt 211. The alternate channel communication prompt is displayed 212 on client 102_1 and is displayed 214 on client 102_2. The alternate channel communication prompt signals to the participants that the message thread is being actively viewed by each participant.

Figure 3:
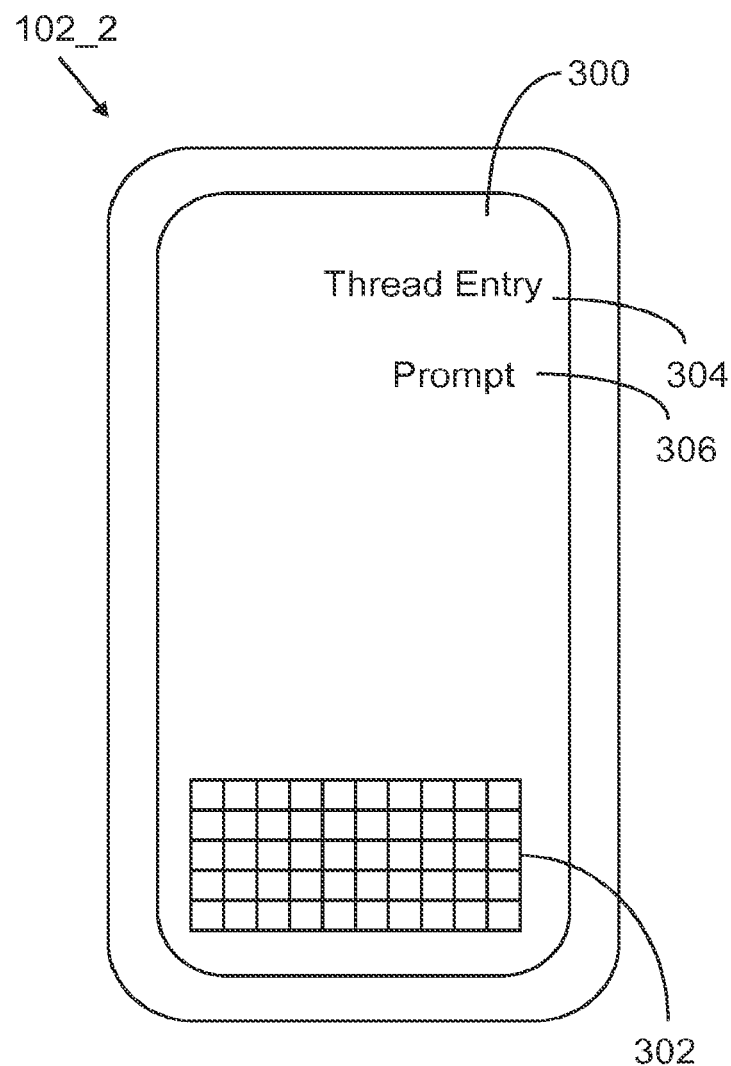
FIG. 3 illustrates user interface attributes associated with an embodiment of the invention.

FIG. 3 illustrates client device 102_2 with a display 300 and keyboard 302. The display shows a thread entry 304 and an associated prompt 306 indicating common viewing of the thread. The prompt 306 may be in the form of text, an icon, an image and the like.

Returning to FIG. 2, the message server 104 determines whether the prompt is activated 216. For example, activation may be in the form of haptic contact by the participant on the prompt as displayed on a screen. If a prompt is activated, then the message server 104 delivers (e.g., un-mutes the set up call) the alternate channel communication 218. The alternate channel communication may be presented 220 on client 102_1 and/or be presented 222 on client 102_2. The processing of FIG. 2 is advantageous because of the proactive activation of the alternate channel communication before a prompt is activated. An alternate embodiment may activate the alternate channel communication in response to prompt activation.

Figure 4:
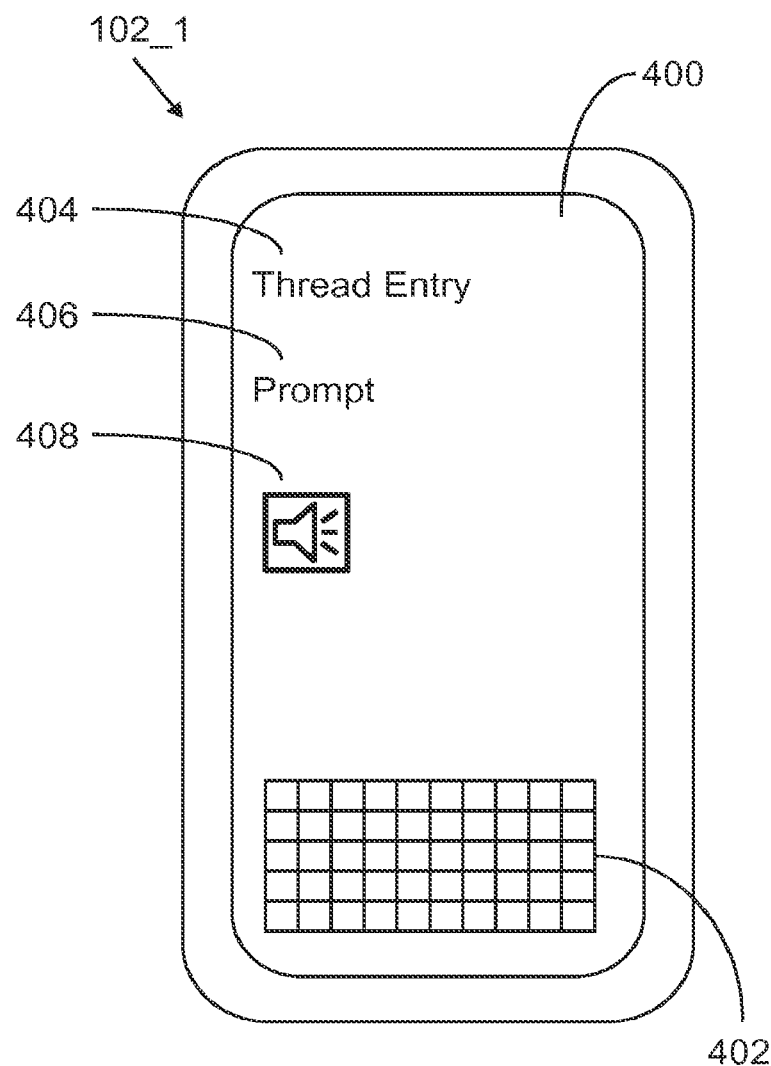
FIG. 4 illustrates user interface attributes, including an alternate channel communication indicator, associated with an embodiment of the invention.

FIG. 4 illustrates client 102_1 with a display 400 and keyboard 402. The display 400 has a thread entry 404, a prompt 406 and an alternate channel indicator 408. In this example, the alternate channel indicator 408 may be a speaker indicative of an audio channel being initiated by the participant using client device 102_2. The alternate channel indicator 408 may be a block of video initiated by the participant using client device 102_2. In the example of FIG. 4, the message thread is shown with the alternate channel indicator. Alternately, the alternate channel indicator may occupy the entire display, which would be desirable in the case of a video session.

In one embodiment, the alternate channel communication persists during haptic contact with the alternate channel communication prompt by at least one participant. The alternate channel communication may include input from each participant making haptic contact with the alternate channel communication prompt.

The alternate channel communication may be a unidirectional audio session initiated through haptic content of a prompt by a first participant that is broadcast to the remaining participants. The alternate channel communication may be a bidirectional audio session between participants making haptic contact with the alternate channel communication prompt.

The alternate channel communication may be a unidirectional video session initiated through haptic contact of a prompt by a first participant that is broadcast to the remaining participants. The alternate channel communication may be a bidirectional video session between participants making haptic contact with the alternate channel communication prompt.

The prompt may include channel selection options, such as audio and/or video. The alternate channel communications may be coordinated through the message server using Internet Protocol packet switching techniques.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A server, comprising:
a processor; and
a memory storing instructions executed by the processor to:
identify when a first participant at a first client device and a second participant at a second client device are actively viewing a common message thread at a same time;
provide, in response to the identifying and without input from the first or second participants, for an alternate channel communication prompt to be displayed on the first client device and on the second client device, the alternate channel communication prompt being user-selectable for alternate channel communication between the first and second client devices;
receive, from the first client device, an indication of user selection of the alternate channel communication prompt by the first participant; and
in response to receiving the indication,
provide for the alternate channel communication between the first and second client devices, and
provide for an alternate channel communication indicator to be displayed on the second client device, the alternate channel communication indicator being displayed together with the alternate channel communication prompt and indicating that the alternate channel communication was initiated by the first participant using the first client device.

2. The server of claim 1, wherein the alternate channel communication indicator comprises a speaker icon when the alternate channel communication is audio-based, and
wherein alternate channel communication indicator comprises a video icon when the alternate channel communication is video-based.

3. The server of claim 1, wherein the alternate channel communication persists during haptic contact with the alternate channel communication prompt by the first participant.

4. The server of claim 3, wherein the alternate channel communication further includes input from the second participant making haptic contact with the alternate channel communication prompt displayed on the second client device.

5. The server of claim 1, wherein the alternate channel communication is a unidirectional audio session initiated by the first participant that is broadcast to the second participant.

6. The server of claim 1, wherein the alternate channel communication is a bidirectional audio session between the first and second participants making haptic contact with the alternate channel communication prompt.

7. The server of claim 1, wherein the alternate channel communication is a unidirectional video session initiated by the first participant that is broadcast to the second participant.

8. The server of claim 1, wherein the alternate channel communication is a bidirectional video session between the first and second participants making haptic contact with the alternate channel communication prompt.

9. The server of claim 1, wherein the memory stores instructions executed by the processor to:
proactively activate an alternate channel communication in response to the identifying, wherein the alternate channel communication is a telephone call muted; and
un-mute the telephone call in response to activation of the alternate channel communication prompt.

10. The server of claim 1, wherein the memory stores instructions executed by the processor to:
activate the alternate channel communication in response to receiving the indication.

11. A method, comprising:
identifying when a first participant at a first client device and a second participant at a second client device are actively viewing a common message thread at a same time;
providing, in response to the identifying and without input from the first or second participants, for an alternate channel communication prompt to be displayed on the first client device and on the second client device, the alternate channel communication prompt being user-selectable for alternate channel communication between the first and second client devices;
receiving, from the first client device, an indication of user selection of the alternate channel communication prompt by the first participant; and
in response to receiving the indication,
providing for the alternate channel communication between the first and second client devices, and
providing for an alternate channel communication indicator to be displayed on the second client device, the alternate channel communication indicator being displayed together with the alternate channel communication prompt and indicating that the alternate channel communication was initiated by the first participant using the first client device.

12. The method of claim 11, wherein the alternate channel communication indicator comprises a speaker icon when the alternate channel communication is audio-based, and
wherein alternate channel communication indicator comprises a video icon when the alternate channel communication is video-based.

13. The method of claim 11, wherein the alternate channel communication persists during haptic contact with the alternate channel communication prompt by the first participant.

14. The method of claim 13, wherein the alternate channel communication further includes input from the second participant making haptic contact with the alternate channel communication prompt displayed on the second client device.

15. The method of claim 11, wherein the alternate channel communication is a unidirectional audio session initiated by the first participant that is broadcast to the second participant.

16. The method of claim 11, wherein the alternate channel communication is a bidirectional audio session between the first and second participants making haptic contact with the alternate channel communication prompt.

17. The method of claim 11, wherein the alternate channel communication is a unidirectional video session initiated by the first participant that is broadcast to the second participant.

18. The method of claim 11, wherein the alternate channel communication is a bidirectional video session between the first and second participants making haptic contact with the alternate channel communication prompt.

19. The method of claim 11, further comprising:
proactively activating an alternate channel communication in response to the identifying, wherein the alternate channel communication is a telephone call muted; and
un-muting the telephone call in response to activation of the alternate channel communication prompt.

20. A non-transitory computer-readable medium comprising instructions, which when executed by a computing device, cause the computing device to perform operations comprising:
identifying when a first participant at a first client device and a second participant at a second client device are actively viewing a common message thread at a same time;
providing, in response to the identifying and without input from the first or second participants, for an alternate channel communication prompt to be displayed on the first client device and on the second client device, the alternate channel communication prompt being user-selectable for alternate channel communication between the first and second client devices;
receiving, from the first client device, an indication of user selection of the alternate channel communication prompt by the first participant; and
in response to receiving the indication,
providing for the alternate channel communication between the first and second client devices, and
providing for an alternate channel communication indicator to be displayed on the second client device, the alternate channel communication indicator being displayed together with the alternate channel communication prompt and indicating that the alternate channel communication was initiated by the first participant using the first client device.

* * * * *